3,418,569
PROTECTIVE RELAYS FOR POLYPHASE
ELECTRICAL SYSTEMS
Eric Paddison, Stafford, England, assignor to The English Electric Company Limited, London, England, a British company
Filed July 29, 1965, Ser. No. 475,702
Claims priority, application Great Britain, Aug. 5, 1964, 31,872/64
3 Claims. (Cl. 324—52)

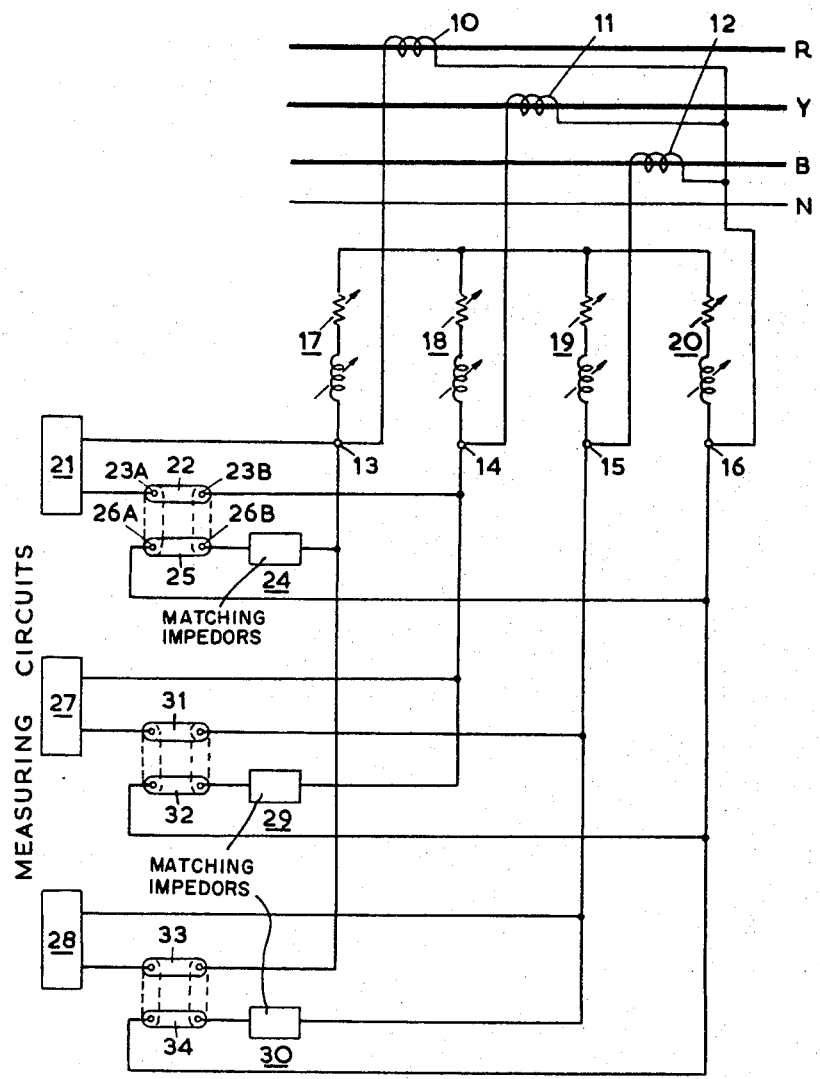

ABSTRACT OF THE DISCLOSURE

This invention relates to a protective relay for a polyphase electrical system, in particular a distance relay, in which the usual measuring circuits are, in this case, associated with matching impedors through change-over switches, the circuit relationship between these elements and a replica impedance of the system being such that by actuation of the change-over switches the measuring circuits may measure either line (phase-to-phase) values or phase (phase-to-neutral) values of current or voltage, e.g., for detecting phase faults or earth faults, respectively, without affecting the relay calibration, whereas hitherto the detection of these two different classes of faults has either necessitated recalibration of the relay or has involved a sacrifice in accuracy.

---

The invention relates to protective relays for polyphase electrical systems.

From one aspect the present invention consists in a protective relay for a polyphase electrical system comprising a polyphase replica impedance network of said system connected to receive signals dependent on electrical conditions therein, separate measuring circuits connected between corresponding phases of the network and an associated change-over means, and separate matching impedors each having an impedance which matches that of its associated measuring circuit similarly connected between the corresponding phases and the change-over means, the change-over means being selectively operative either to connect the measuring circuits between adjacent phases and the matching impedors between their corresponding phases and a common neutral or to connect the measuring circuits between their phases and neutral and the matching impedors between adjacent phases whereby to permit the measuring circuits to measure either line values or phase values without affecting the calibration of the relay.

This invention finds particular application in distance relay measuirng circuits where a relay is, ideally, easily adjustable to measure either line (phase-to-phase) or phase (phase-to-neutral) values of current or voltage without requiring recalibration when switched over from measuring the line to measuring the phase values, or vice versa. Further, such relay measuring circuits conform to calibration under fault conditions in the power system including earth faults, and faults affecting two or more phases. In addition, with a relay according to this invention it is possible to use electrical power levels in the measuring circuits which are not negligible compared with the power level in the replica impedor network whilst still maintaining accuracy of measurement under all the conditions mentioned; this reduces both the overall power level required by the relay and the rating of its electrical components compared with similar relays hitherto proposed.

An electrical protective relay according to the present invention will now be described by way of example and with reference to an accompanying drawing which shows diagrammatically the relevant circuit connections of the relay.

Referring to the drawing, a three-phase electrical power system has electrical conductors marked conventionally R, Y, B and N and is to be protected against fault conditions by a distance relay. This relay includes current transformers 10–12 coupled to the R, Y and B conductors and connected to supply relay input terminals 13–16 respectively as shown. Adjustable replica impedances 17–19 (for each phase) and 20 (for neutral N) representing an electrical analogue of the power system are arranged in a star configuration, and measuirng circuits 21, 27 and 28 are connected to these replica impedances. The functions performed by these replica impedances and the measuring units are exactly the same as those in conventional distance relays and as fully explained, for example, in chapter 5 in "Protective Relays" (vol. 1) by A. R. Van C. Warrington, published by Chapman and Hall.

In this invention, however, the measuring circuit 21 is connected between terminals 13 and 14 by a link 22 linking terminal 23A to 23B. Further, a matching impedor 24 which has the same effective impedance as the measuring circuit 21 is connected by a link 25, between terminals 13 and 16, the link 25 linking terminal 26A to 26B. Measuring circuits 27 and 28 and matching impedors 29 and 30 are similarly connected through links 31 to 34 to the relay input terminals as shown.

In operation, the replica impedances are adjusted so that the respective voltages developed across the replica impedances represent currents flowing in the electrical system. Thus, when the links 22, 31 and 33 are connected as described above the measuirng circuits 21, 27 and 28 are effective to measure voltages proportional to the system line currents developed respectively between terminals 13 and 14, 14 and 15, and 15 and 13; that is, the measuring circuits are connected in effect in delta across the terminals 13 to 15, whilst the matching impedors are connected in star to the terminal 16.

The links 22 and 25 may be connected instead to link terminals 23A to 26A and 23B to 26B respectively so that the measuring circuit 21 is then connected between terminals 13 and 16 and the matching impedor is then connected between terminals 13 and 14. With the links 31 to 34 similarly connected, that is as shown dotted in the diagram, all the measuring circuits are then connected in star to terminal 16 and all the matching impedors are connected in delta. In this position, the measuring circuits are effective to measure voltages proportional to system phase currents.

Since the matching impedors exhibit the same effective impedance as their associated measuring circuits the relay has the same input impedance at the terminals 13 to 16 for measuring on the one hand system line currents or on the other hand system phase currents.

The matching impedors may be complex, non-linear impedors arranged to closely match the impedance effect of the respective measuring circuits. Alternatively, the matching impedors may be designed to closely match the impedance effect of measuring circuits only for a specific relay measuring range, e.g., at an extremity or boundary of a desired relay characteristic for example.

It will be appreciated that all or some of the links may be replaced by contactor or static switches as desired. Furthermore, the replica impedances 17–20 may be supplied with electrical signals dependent on the voltages in the system. The invention is equally applicable to any multi-phase electrical system having more, or less, than the three phases shown.

What I claim as my invention and desire to secure by Letters Patent is:

1. A protective relay for a polyphase electrical system having a common neutral conductor, comprising
   a polyphase impedance network connected to said system for receiving signals dependent on conditions therein and including separate replica impedors associated with each phase and with the said common neutral,
   change-over switches associated with each phase,
   separate measuring circuits associated with each phase and connected between the corresponding replica impedors and an associated one of said change-over switches, and
   separate matching impedors each having an impedance which matches that of its associated measuring circuit connected between the corresponding replica impedors and the change-over switches, the change-over switches being selectively operative on the one hand to connect the measuring circuits between different phases of the system and the matching impedors between their corresponding phases and the common neutral and, on the other hand, to connect the measuring circuits between their phases and neutral and the matching impedors between different phases of the system whereby to permit the measuring circuits to measure line and phase values, respectively, without affecting the calibration of the relay.

2. A protective relay according to claim 1, wherein the impedance of the matching impedor matches its associated measuring circuit only over part of its measuring range.

3. A protective relay according to claim 2, wherein the measuring circuits are calibrated to measure the distance of an electrical fault from a relay.

References Cited

UNITED STATES PATENTS

| 3,192,442 | 6/1965 | Warrington et al. | 317—36 |
| 3,210,606 | 10/1965 | Calhoun | 317—27 XR |

FOREIGN PATENTS

| 1,164,552 | 3/1964 | Germany. |

RUDOLPH V. ROLINEC, *Primary Examiner.*

G. R. STRECKER, *Assistant Examiner.*

U.S. Cl. X.R.

317—36